United States Patent
Gavieiro-Villatte et al.

(10) Patent No.: US 7,584,091 B2
(45) Date of Patent: Sep. 1, 2009

(54) PROCESS AND DEVICE FOR DEVISING AN ABRIDGED FORM OF ANY TERM THAT IS USED IN AN ALARM MESSAGE INTENDED TO BE DISPLAYED ON A SCREEN OF THE COCKPIT OF AN AIRCRAFT

(75) Inventors: Elisa Gavieiro-Villatte, Peyrehorade (FR); Florence Beaujard, Plaisance du Touch (FR)

(73) Assignee: AIRBUS France, Toulouse (FR)

( * ) Notice: Subject to any disclaimer, the term of this patent is extended or adjusted under 35 U.S.C. 154(b) by 782 days.

(21) Appl. No.: 10/465,844

(22) Filed: Jun. 20, 2003

(65) Prior Publication Data
US 2003/0236668 A1 Dec. 25, 2003

(30) Foreign Application Priority Data
Jun. 24, 2002 (FR) .................................. 02 07774

(51) Int. Cl.
G06F 17/27 (2006.01)
G06F 17/21 (2006.01)
G09B 11/08 (2006.01)

(52) U.S. Cl. .............................. 704/9; 704/10; 434/158

(58) Field of Classification Search ...................... 704/4, 704/9, 10; 715/531, 534; 434/158, 179
See application file for complete search history.

(56) References Cited

U.S. PATENT DOCUMENTS

| | | | | |
|---|---|---|---|---|
| 4,969,097 A | * | 11/1990 | Levin | .......................... 715/534 |
| 5,410,475 A | * | 4/1995 | Lu et al. | .......................... 704/1 |
| 5,420,973 A | * | 5/1995 | Dagdeviren | .................. 715/508 |
| 5,867,164 A | * | 2/1999 | Bornstein et al. | ........... 715/530 |
| 6,056,551 A | * | 5/2000 | Marasco | ...................... 434/178 |
| 6,188,976 B1 | | 2/2001 | Ramaswamy et al. | |

(Continued)

FOREIGN PATENT DOCUMENTS

EP 1067465 1/2001

(Continued)

OTHER PUBLICATIONS

Benbasat, Izak & Wand, Yair; "Command Abbreviation Behavior in Human-Computer Interaction"; Communications of the ACM, Apr. 1984, vol. 27, No. 4, pp. 376-383.*

(Continued)

*Primary Examiner*—Richemond Dorvil
*Assistant Examiner*—Douglas C Godbold
(74) *Attorney, Agent, or Firm*—Dickinson Wright, PLLC (57) ABSTRACT

A system for devising an abridged form of any term that is used in an alarm message intended to be displayed on a screen of the cockpit of an aircraft. The system includes a database having a set of predetermined construction rules and a processor that receives a message term and subjects the term to the construction rules so as to automatically form a plurality of different abbreviations of the term. A human interface allows an operator to analyze the abbreviations by subjecting each of them to a transparency criterion. And a selection section selects one abbreviation as an abridged form for the term based on an analysis response received from the operator.

3 Claims, 2 Drawing Sheets

U.S. PATENT DOCUMENTS

| | | | |
|---|---|---|---|
| 6,279,018 B1* | 8/2001 | Kudrolli et al. | 715/540 |
| 6,452,597 B1* | 9/2002 | Goldberg et al. | 345/472 |
| 6,925,613 B2* | 8/2005 | Gibson | 715/864 |
| 7,069,207 B2* | 6/2006 | Corston-Oliver et al. | 704/9 |
| 2005/0240391 A1* | 10/2005 | Lekutai | 704/2 |

FOREIGN PATENT DOCUMENTS

| | | |
|---|---|---|
| EP | 1102177 | 5/2001 |
| FR | 2825496 | 12/2002 |
| WO | 0193246 | 12/2001 |
| WO | 02071391 | 9/2002 |

OTHER PUBLICATIONS

Barrett, June A. & Grems, Mandalay; "Abbreviating Words Systematically"; Communications of the ACM, May 1960, vol. 3, Issue 5, pp. 323-324.*

Bourne, Charles P. & Ford, Donald F.; "A Study of Methods For Systematically Abbreviating English Words and Names"; Communications of the ACM, Oct. 1961, vol. 8, Issue 4, pp. 538-552.*

Preliminary Search Report dated Jun. 19, 2003.

B. Murray, "Message Abbreviation", Motorola Technical Developments, vol. 19, Jun. 1993, pp. 51-53, XP000361472.

D. Howell, et al., "Message Compression With Human-Readable Abbreviations", IBM Technical Disclosure Bulletin, vol. 25, No. 2, Jul. 1982, pp. 678-682, XP000714026.

* cited by examiner

Fig. 3

PROCESS AND DEVICE FOR DEVISING AN ABRIDGED FORM OF ANY TERM THAT IS USED IN AN ALARM MESSAGE INTENDED TO BE DISPLAYED ON A SCREEN OF THE COCKPIT OF AN AIRCRAFT

FIELD OF THE INVENTION

The present invention relates to a process and a device for devising an abridged form of any term that is used in at least one alarm message intended to be displayed on at least one screen of the cockpit of an aircraft, for example a transport airplane.

BACKGROUND OF THE RELATED ART

It is known that, when during a flight an airplane departs from its nominal configuration, an alarm system generally intervenes by generating alarms. The object of these alarms is in particular to allow the pilots of the airplane:
  to ascertain any fault state and its degree of gravity;
  to unambiguously identify any faulty circuit; and
  to indicate with no risk of confusion the appropriate corrective action or actions (or operations).

These objectives are achieved by combining textual alarm messages, luminous signals and/or audible signals, broadcast by appropriate peripheral equipment.

Moreover, when such an alarm is triggered, the pilots are required to carry out precise and tricky tasks, often under emergency conditions.

For this purpose, the sharing of the tasks, as well as the handling of the situation, are based very much on protocols. Specifically, a first pilot ("pilot flying") takes charge of the continuation of the flight, while the second pilot ("pilot not flying") handles the fault.

To do this, at least one display screen, for example an "ECAM" screen forming part of a centralized device for monitoring various systems of the airplane, indicates to the pilots the list of the operations to be performed in order to remedy the fault or at the very least to limit its negative effects. For this purpose, the second pilot reads out loudly each operation to be carried out. In the case of critical faults, he anticipates the action by placing his hand on the control to be actuated, waiting for the approval of the first pilot before executing. In the case of less critical faults, he executes the action directly. The first pilot listens carefully to the instructions read out by the second pilot and verifies that the action has been correctly anticipated, or that it has been correctly accomplished. He expresses his approval by loudly repeating the operation that he has heard.

For safety reasons, it is therefore absolutely necessary for the various textual alarm messages to be properly recognized and understood by each of the pilots. Now, for space reasons, said alarm messages are formed essentially from abbreviations that the pilots must therefore be able to recognize quickly and unambiguously.

Furthermore, if the alarm messages are generally constructed on the basis of English which is the official language in aeronautics, nevertheless very many of the pilots who are required to pilot airplanes are from very distinct cultural and linguistic origins. Thus, there are several linguistic configurations of flight crews: 100% anglophones, 50% anglophones or 100% non-anglophones (not necessarily sharing the same mother tongue).

This multicultural character, as well as the oral character, make it necessary to consider the alarm messages in a specific manner since, although constructed on the basis of English, these alarm messages are required to be used by multiple nationalities. The alarm messages will be pronounced with multiple accents and understood by numerous ears not all receptive to the same acoustic timbre.

SUMMARY OF THE INVENTION

The object of the present invention is to devise abridged forms of terms used in alarm messages in such a way as to afford an effective response to the needs, requirements and constraints imposed by the aeronautical sector, mainly under operational conditions. The document U.S. Pat. No. 6,188, 976 discloses, for example, an apparatus and a method for forming a particular reference language model.

Additionally, a great many documents relating to the analysis and/or the processing of language are known. One may cite by way of illustration:
  document WO-0193246 which relates to a process making it possible to create a language model, from a task independent corpus. In a particular embodiment, a task dependent unified language model is created. Said unified language model encompasses a plurality of noncontextual grammars with non-terminals and a hybrid model of the N-gram type, at least some of whose non-terminals are identical to those of the noncontextual grammar;
  document WO-02071391 which relates to a process for converting speech into text by using a hierarchy of contextual models. This hierarchy of contextual models is statistically smoothed into a language model. This process consists in processing a text with a plurality of contextual models, each of these models corresponding to a node in a hierarchy of said plurality. The invention also pertains to the identification of at least one of the text-related contextual models and to the processing of the user's subsequent oral utterances by means of the identified contextual model;
  document EP-1 067 465 which describes an application independent language module for language independent applications, which responds to a request originating from an application identifying a concept that is generic to various languages and the language in which this concept is expressed, by generating and returning an expression of the concept identified in the language identified for the application in communication. The language module is implemented in an object oriented programming form and comprises the examples of the following objects of fundamental classes, provided by an infrastructure for developing the language module: a concept object for defining the generic concepts independently of the language and for pointing to definitions of concepts, each defining the corresponding concept in a different language, a concept definition object for defining the concepts independently of the language, for pointing to syntactic analyzers, each expressing a part of an expression of the concept in the language of the definition of the concept, and for associating all the variables that are included in the concept with the syntactic analyzers, and a syntactic analyzer for expressing parts of the expressions of concept and of the values of all the associated variables in the concept definition languages. The variables are defined at the concepts level. Fundamental classes are also included for the languages, the variables and the data types. The development infrastructure furthermore comprises an application program interface for creating, modifying and deleting examples of classes from a database compilable into the language module repository, and a database of media fragments for forming communicable versions of the concepts;

document EP-1 102 177 which relates to an instruction forecasting system for systems comprising natural language, comprising a user interface for receiving instructions from a user. An instruction forecasting system receives the instructions from the user interface and predicts at least one next instruction which ought likely to be presented by the user as a function of an instructions history; and document FR-2 825 496 which relates to a process and a system for large syntactic analysis of corpora, in particular of specialized corpora. The large syntactic analysis process is based on unsupervised learning on a corpus, comprising an iterative sequencing of two phases:

a learning phase, in which linguistic information is acquired from unambiguous analysis cases; and a resolution phase, in which the ambiguous analysis cases are resolved by utilizing the information acquired during the learning phase.

A specialized corpus represents a set of texts pertaining to a specialized field or particular technique. Any corpus of this type is characterized, on the one hand, by a certain thematic homogeneity and, on the other hand, by great syntactic complexity: these corpora are written in technical jargon using relatively long technical terms of high syntactic complexity. This generally makes the automatic syntactic analysis of specialized corpora particularly difficult, in particular on account of the multiple cases of ambiguity of prepositional attachment.

The present invention therefore relates to a process for devising an abridged form of any term that is used in at least one alarm message intended to be displayed on at least one screen of the cockpit of an aircraft.

According to the invention, said process is noteworthy in that:

a) said term is subjected to a set of predetermined construction rules in such a way as to form a plurality of different abbreviations of said term;

b) the abbreviations thus formed are analyzed by subjecting each of them to at least one transparency criterion; and c) on the basis of this analysis, one selects as abridged form for said term:

if just one of said abbreviations satisfies said transparency criterion, this abbreviation;

if none of said abbreviations satisfies said transparency criterion, said term in full; and if several of said abbreviations satisfy said transparency criterion, that which satisfied said transparency criterion quickest.

Advantageously, said set of construction rules comprises at least some of the following rules:

addition of a morphological mark;
deletion of the vowels;
truncation;
retention of the syllables;
retention of the initial letter of each syllable; and
deletion of the double consonants.

Furthermore, advantageously, said transparency criterion comprises two parameters:

the correctness of recognition of the term on the basis of the abbreviation; and the duration for recognition.

Preferably, in step b), the analysis is implemented by at least one aircraft pilot.

Additionally, said process in accordance with the invention can make it possible to devise the abridged forms of a plurality of terms with which a preestablished abbreviation is already associated each time. In this case, advantageously, the following operations are carried out:

said preestablished abbreviations are analyzed by subjecting each of them to at least one transparency criterion; and on the basis of this analysis:

for the abbreviations which have satisfied said transparency criterion, they are retained as abridged forms for the corresponding terms; and for the abbreviations which have not satisfied said transparency criterion, said steps a) to c) are implemented, for each of the terms associated with said abbreviations, so as to devise the appropriate abridged forms.

Additionally, advantageously, in a preliminary step, an appropriate term is chosen for at least one concept relating to the aircraft, for which term said steps a) to c) are subsequently implemented by carrying out the following operations:

a predetermined initial word, that is used for said concept, is analyzed by subjecting it to a first set of decisional criteria;

on the basis of this analysis:

if said initial word satisfies all the decisional criteria of said first set, this initial word is used as appropriate term for said concept; and if said initial word does not satisfy all these decisional criteria of said first set, at least one additional word is determined for this concept, which is different from said initial word; then:

said initial and additional words are subjected to a second set of decisional criteria; and that of said initial and additional words which satisfied the largest number of decisional criteria of said second set is used as appropriate term for said concept.

In this case, preferably:

said second set of decisional criteria comprises at least some of the following criteria:

syntactic criteria;
terminological criteria; and
aeronautical criteria; and/or said first set of decisional criteria corresponds to said second set of decisional criteria.

The present invention also relates to a device for devising an abridged form of any term that is used in at least one alarm message intended to be displayed on at least one screen of the cockpit of an aircraft.

According to the invention, said device is noteworthy in that it comprises:

at least one first database comprising a set of predetermined construction rules;

a processing means which is connected to said first database, which is able to receive terms and which subjects every term received to said set of predetermined construction rules in such a way as to automatically form a plurality of different abbreviations of said term;

at least one first means allowing at least one operator to analyze the abbreviations thus formed by subjecting each of them to at least one transparency criterion; and a second means connected to said first means and selecting, as a function of said analysis, an abridged form for said term.

Furthermore, in a preferred embodiment, said device moreover comprises:
- at least one second database comprising, for a plurality of terms, preestablished abbreviations;
- at least one third means allowing at least one operator to analyze said preestablished abbreviations by subjecting each of them to at least one transparency criterion; and
- a fourth means connected to said third means and indicating, as a function of said analysis, whether said abbreviations are or are not retained as abridged forms for the corresponding terms.

Additionally, advantageously, the device in accordance with the invention furthermore comprises:
- at least one third database comprising initial words that are used for particular concepts relating to the aircraft;
- at least one fourth database comprising a first set of decisional criteria;
- at least one fifth means allowing at least one operator to analyze at least some of said initial words by subjecting each of them to said first set of decisional criteria;
- a sixth means connected to said fifth means and indicating, as a function of said analysis, whether said initial words are or are not retained as appropriate terms for said concepts;
- at least one fifth database comprising a second set of decisional criteria;
- at least one sixth database comprising additional words for said concepts;
- at least one seventh means allowing at least one operator to analyze the initial words not retained and the corresponding additional words by subjecting them to said second set of decisional criteria; and
- an eighth means connected to said seventh means and indicating, as a function of said analysis, which of those, from among said initial words not retained and said additional words, are used as appropriate terms for the corresponding concepts.

BRIEF DESCRIPTION OF THE DRAWINGS

The figures of the appended drawing will elucidate the manner in which the invention may be embodied. In these figures, identical references denote similar elements.

DETAILED DESCRIPTION OF THE INVENTION

Figure 1:
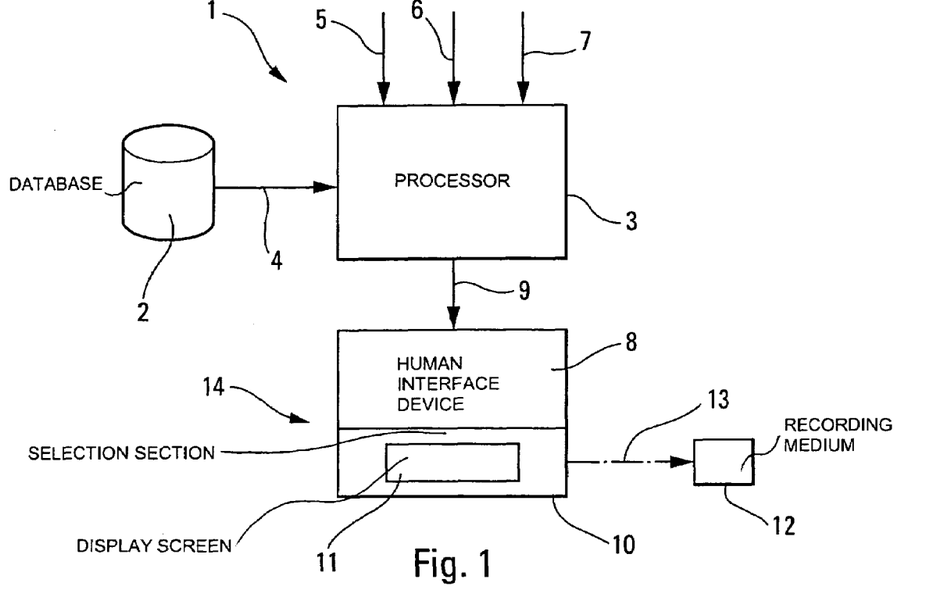
FIG. 1 is the schematic diagram of a device in accordance with the invention.

The device 1 in accordance with the invention and represented diagrammatically in a basic embodiment in FIG. 1, is intended for devising an abridged form for the terms that are used in alarm messages intended to be displayed on at least one screen, for example of "ECAM" type, of the cockpit of an aircraft, in particular of a transport airplane.

According to the invention, said device 1 comprises:
- a database 2 comprising a set of predetermined construction rules, specified hereinbelow;
- a processing means 3 which is connected to said database 2 by a link 4, which is able to receive terms via links 5, 6 and 7 specified hereinbelow, and which subjects every term received to said set of predetermined construction rules in such a way as to automatically form a plurality of different abbreviations of said term;
- a means 8 connected by a link 9 to the processing means 3 and allowing at least one operator to analyze the abbreviations thus formed by subjecting each of them to at least one transparency criterion; and
- a means 10 selecting, as a function of said analysis, an abridged form for said term.

Said means 10 selects as abridged form for said term:
- if just one of said abbreviations satisfies said transparency criterion, this abbreviation;
- if none of said abbreviations satisfies said transparency criterion, said term in full; and
- if several of said abbreviations satisfy said transparency criterion, that which satisfies said transparency criterion best (quickest, as specified hereinbelow).

Said means 10 can present the results of its selection, for example, on a display screen 11, or record them on a standard recording medium 12, as illustrated by a chain-dotted link 13 in FIG. 1.

According to the invention, said database 2 comprises at least the following rules:
- addition of a morphological mark;
- deletion of the vowels;
- truncation;
- retention of the syllables;
- retention of the initial letter of each syllable; and
- deletion of the double consonants.

Additionally, the transparency criterion used by one or more operators to analyze the abbreviations formed by the processing means 3, comprises two parameters presenting the following order of priority:
1/ the correctness of recognition of the term on the basis of the abbreviation; and
2/ the duration for recognition.

Thus, to decide between two abbreviations from the point of view of their transparency, the accuracy or correctness of the responses takes precedence over the duration (or the speed) of recognition. The latter parameter is, however, used to decide between several abbreviations which have satisfied said first priority parameter in the same manner.

In a preferred embodiment, said means 8 and 10 may form part of one and the same processing unit 14, in particular a computer, for example a personal computer.

This computer 14 can receive, for example automatically, the abbreviations of said processing means 3 and present them to the operator, in particular by displaying them on the screen 11 or by printing them on a medium such as a slip of paper for example. The operator, by analyzing the abbreviations (with respect to the transparency criterion), can enter his responses into the computer 14 by way of the means 8, for example an alphanumeric keypad or a computer mouse or else a means of electronic reading of a slip of paper which has been filled in by the operator. The means 10, for example a processor, then digests these responses so as to carry out the selection of the abridged form appropriate to each term.

Preferably, at least one or more pilots of an aircraft are requested to carry out the aforesaid analysis with the transparency criterion, since it is they who will have to use the abridged forms chosen and they are therefore the most apt to do this analysis.

Figure 2:
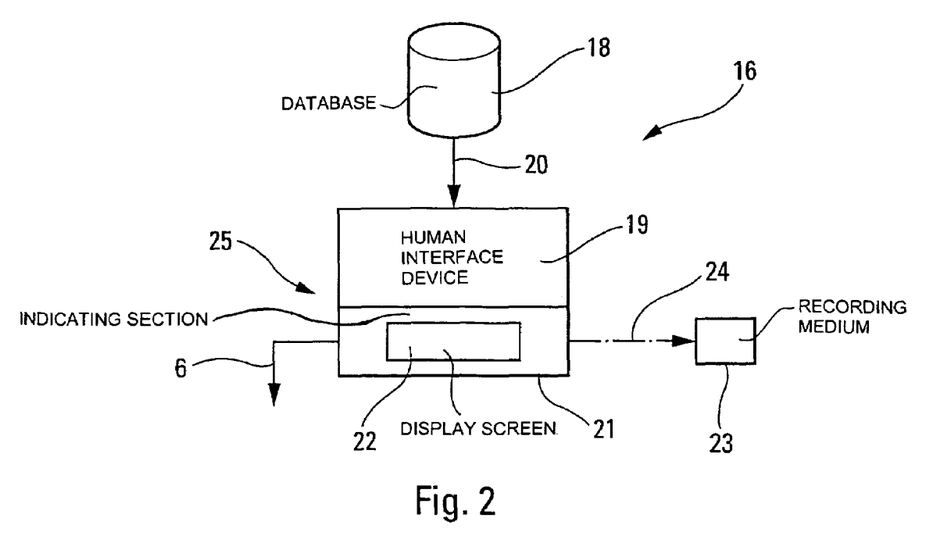
FIGS. 2 and 3 show specific units forming part, in particular embodiments, of a device in accordance with the invention.
Figure 3:
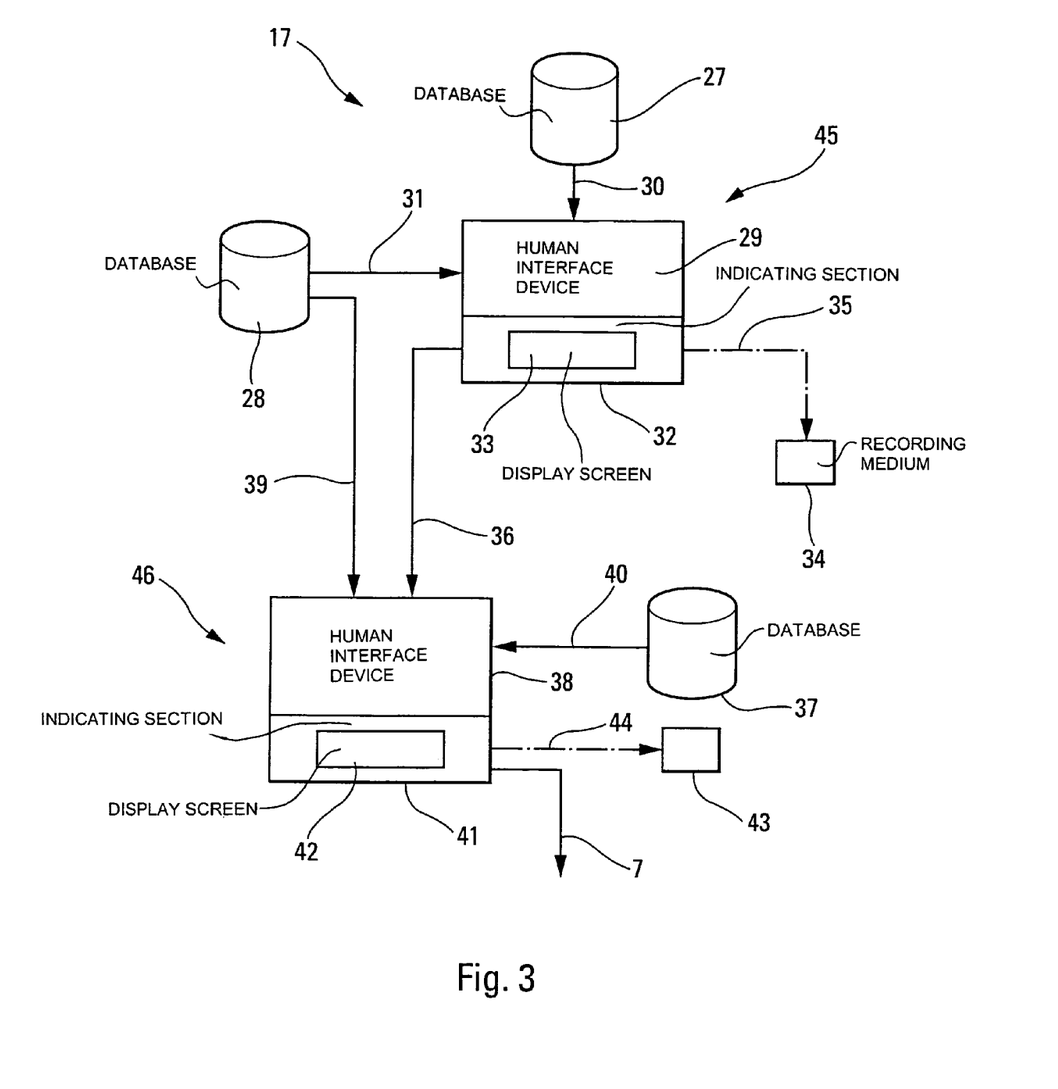

As regards the terms that are processed by the processing unit 3, they may be provided to the latter:
- by way of the link 5, directly by an operator; or
- by way of the link 6, by a complementary unit 16 represented in FIG. 2 and possibly forming part of the device 1 in accordance with the invention; or by way of the link 7, by a complementary unit 17 represented in FIG. 3 and possibly forming part of the device 1 in accordance with the invention.

The object of the unit 16 is to devise the abridged forms of a plurality of terms with which a preestablished abbreviation is already associated each time.

For this purpose, said unit 16 comprises:
- a database 18 comprising, for said plurality of terms, said preestablished abbreviations;
- a means 19 connected by a link 20 to the database 20 and allowing at least one operator to analyze said preestablished abbreviations by subjecting each of them to at least one transparency criterion. Preferably, said transparency criterion is the correctness of recognition of the term on the basis of the abbreviation; and
- a means 21 connected to said means 19 and indicating, as a function of said analysis, whether said abbreviations are or are not retained as abridged forms for the corresponding terms.

According to the invention:
- concerning the abbreviations that have satisfied said transparency criterion, they are all retained as abridged forms for the corresponding terms. The means 21 can present these retained abridged forms on a display screen 22 or record them on a standard recording medium 23, as illustrated by a chain-dotted link 24; and
- concerning the abbreviations that have not satisfied said transparency criterion, said means 21 can transmit them to the processing unit 3 via the link 6, so as to apply the aforesaid processing to them.

Said means 19 and 21 may also form part of a processing unit 25 (personal computer, for example) that is similar to the processing unit 14 of FIG. 1.

Additionally, the object of the unit 17 represented in FIG. 3 is to select for various aircraft concepts used in the alarm messages, each time, an appropriate term for which one will subsequently search for the most fitting abridged form.

Said unit 17 comprises for this purpose:
- a database 27 comprising initial words that are used for particular concepts;
- a database 28 comprising a first set of decisional criteria;
- a means 29 connected by links 30 and 31 respectively to said databases 27 and 28 and allowing at least one operator to analyze at least some of said initial words by subjecting each of them to said first set of decisional criteria;
- a means 32 connected to said means 29 and indicating, as a function of said analysis, whether said initial words are or are not retained as appropriate terms for said concepts. If they are retained, said means 32 can display them (display screen 33) or record them on an appropriate medium 34 (link 35) and, if they are not retained, it can transmit them via a link 36;
- a database comprising a second set of decisional criteria. In the preferred embodiment represented in FIG. 3, said second set of decisional criteria corresponds to said first set of decisional criteria, so that a single database 28 is sufficient for both sets;
- a database 37 comprising additional words for said concepts;
- a means 38 connected by links 39 and 40 respectively to said databases 28 and 37 and allowing at least one operator to analyze the initial words not retained and the corresponding additional words by subjecting them to said second set of decisional criteria; and
- a means 41 connected to said means 38 and indicating, as a function of said analysis, which of those, from among said initial words not retained and said additional words, are used as appropriate terms for the corresponding concepts.

Said means 41 can present the results, for example, on a display screen 42, or record them on a standard recording medium 43, as illustrated by a chain-dotted link 44 in FIG. 3 or else transmit them to the processing unit 3 via the link 7.

The means 29 and 32, 38 and 41 can also form part of a processing unit 45, 46 (personal computer for example) which is similar to the processing unit 14 of FIG. 1.

According to the invention, said first and second sets of decisional criteria comprise at least some of the following criteria:
- syntactic criteria;
- terminological criteria; and
- aeronautical criteria.

More precisely, the syntactic criteria relate to derivational and flexional phenomena and are organized into four groups: three groups are dedicated to the phenomenon of desinence: final morpheme of a word that expresses the grammatical flexion, that is to say the case and the number of the substantives and adjectives and the tense and the mode of the verbs, and a fourth group deals with prefixation. The terminological criteria consist of various types of tags: homography, homophony, synonymy. The terminological criteria also cover the genealogical criteria and those of geographic trend. The aeronautical criterion, for its part, involves exploring attested and recognized documents that form part either of the internal documentation, or of the external documentation. The expression internal documentation is understood to mean the documentation over which an aeronautical manufacturer has power of modification, both from the point of view of the content and of the guise in which the content appears (put into matrix form). Conversely, the expression external documentation is understood to mean the documentary references over which an aeronautical manufacturer has no decisional power of modification, such as international standards, documentation from other aeronautical manufacturers, etc.

Various examples of processing implemented by the device 1 in accordance with the present invention are specified hereinbelow:

A/ If an operator or one of the units 16 or 17 enters the term "window" [English being the (official) language used in aeronautics] into the processing means 3, the latter forms the following abbreviations (the construction rules used for this purpose are presented between brackets):

| | |
|---|---|
| WNDW | (deletion of the vowels); |
| WIN | (posterior truncation onward of the third letter); |
| WIND | (retention of the first syllable and of the first letter of the second syllable); and |
| WDW | (retention of the initial letter of each syllable and of the final letter of the term), | the other construction rules not being applicable in this instance.

Among these abbreviations, WIN and WIND are not assessed, since they resemble existing words. On the other hand, the abbreviations WNDW and WDW are subjected to the transparency criterion and 70% of operators (pilots, etc.) recognize the word "window" on the basis of WDW and 90% on the basis of "WNDW".

Moreover, WNDW was recognized in a shorter duration than the duration of recognition of WDW.

On the basis of these results, the means 10 therefore adopts "WNDW" as abridged form for the term "window".

B/ For the term "aircraft", the database 18 of FIG. 2 contains the preestablished abbreviation "A/C". Now, this abbreviation does not satisfy the transparency criterion implemented by the means 19. Thus, the means 21 transmits this term to the processing unit 3 (FIG. 1) which forms the following abbreviations:

| | |
|---|---|
| ARCRFT | (deletion of the vowels); |
| AIR | (posterior truncation onward of the third letter); |
| AIRC | (retention of the first syllable and of the first letter of the second syllable); and |
| ACT | (retention of the initial letter of each syllable and of the final letter of the term). |

The abbreviations AIR and ACT that too closely resemble existing words are not assessed. For the remaining two abbreviations (AIRC and ARCRFT), only ARCRFT fulfils the transparency criterion.

C/ For the concept of abnormality, the term "abnormal" emanating from the database 27 of FIG. 3 is known. Now, this term does not comply with all the decisional criteria (means 29). The term "(not) normal" emanating from the database 37 is associated with it. The decisional procedure aimed at deciding between the terms "abnormal" and "(not) normal" is implemented by the means 38 and 41. It appears that the term "(not) normal" satisfies the largest number of decisional criteria. Consequently, the means 41 transmits this latter term to the processing unit 3 which forms the following abbreviations:

| | |
|---|---|
| NRML | (deletion of the vowels); |
| NOR | (posterior truncation onward of the third letter); |
| NORM | (retention of the first syllable and of the first letter of the second syllable); and |
| NML | (retention of the initial letter of each syllable and of the final letter of the term). |

The abbreviation NOR is not assessed.

Out of the abbreviations NORM, NRML and NML assessed, NORM and NRML satisfy the first priority parameter (recognition of the term) of the transparency criterion 100%. These two abbreviations are therefore decided between by the second parameter (duration for recognition). NORM is thus selected.

Consequently, for the concept "abnormal", the term "not normal" should be used in the abridged form "NOT NORM".

The invention claimed is:

1. A process to devise an abridged form of any term that is used in at least one alarm message displayed on at least one screen of the cockpit of an aircraft, the process comprising:
    preparing a first presentation of preestablished abbreviations to an operator;
    receiving a first identification of the preestablished abbreviations understood by the operator;
    retaining the identified preestablished abbreviations as abridged forms of corresponding terms; and
    implementing, for each of said terms corresponding to the preestablished abbreviations which are not identified as having been understood by the operator, steps a) through d):
        a) subjecting, by a processor, said term to a set of predetermined construction rules in such a way as to form a plurality of different abbreviations of said term, wherein said set of construction rules comprises all the following rules:
            addition of a morphological mark;
            deletion of the vowels;
            truncation;
            retention of the syllables;
            retention of the initial letter of each syllable; and
            deletion of the double consonants;
        b) preparing a second presentation of the abbreviations formed in step a) for automatic presentation to the operator; and
        c) receiving a second identification of the abbreviations understood by the operator and if several abbreviations are understood by the operator the abbreviation that the operator understood quickest; and
        d) automatically selecting, on the basis of the second identification, the abridged form for said term, wherein this abridged form is:
            if just one of said abbreviations is understood by the operator, this abbreviation;
            if none of said abbreviations is understood by the operator, said term in full; and
            if several of said abbreviations are understood by the operator, that which the operator understood quickest.

2. A process to devise an abridged form of any term that is used in at least one alarm message displayed on at least one screen of the cockpit of an aircraft, the process comprising:
    subjecting a predetermined initial word, which is used for a concept relating to the aircraft, to a first set of decisional criteria;
    using the predetermined initial word as an appropriate term for said concept, if said initial word satisfies all the decisional criteria of said first set;
    if said initial word does not satisfy all the decisional criteria of said first set, subjecting said initial word and at least one additional word that is used for said concept to a second set of decisional criteria and using the word which satisfies the largest number of decisional criteria of said second set as the appropriate term for said concept; and
    implementing on the appropriate term, for said concept, steps a) through d):
        a) subjecting, by a processor, said term to a set of predetermined construction rules in such a way as to form a plurality of different abbreviations of said term, wherein said set of construction rules comprises all the following rules:
            addition of a morphological mark;
            deletion of the vowels;
            truncation;
            retention of the syllables;
            retention of the initial letter of each syllable; and
            deletion of the double consonants;
        b) preparing a presentation of the abbreviations for automatic presentation to at least one operator; and
        c) receiving an identification of the abbreviations understood by the at least one operator and if several abbreviations are understood by the at least one operator the abbreviation that the at least one operator understood quickest; and d) automatically selecting, on the basis of the identification, the abridged form for said term, wherein this abridged form is:
   if just one of said abbreviations is understood by the at least one operator, this abbreviation;
   if none of said abbreviations is understood by the at least one operator, said term in full; and
   if several of said abbreviations are understood by the at least one operator, that which the at least one operator understood quickest.

3. A device to devise an abridged form of any term that is used in at least one alarm message displayed on at least one screen of the cockpit of an aircraft, which device comprises:
   at least one first database comprising a set of predetermined construction rules comprising:
      addition of a morphological mark;
      deletion of the vowels;
      truncation;
      retention of the syllables;
      retention of the initial letter of each syllable; and
      deletion of the double consonants;
   a processor which is connected to said first database, which is able to receive terms and which automatically subjects every term received to said set of predetermined construction rules in such a way as to automatically form a plurality of different abbreviations of said term, wherein each received term is subjected to said set of predetermined construction rules without previously being subjected to a lexical analysis, a morphological analysis, or a syntactic analysis;
   a first presentation section which receives the abbreviations and which automatically presents them in a first presentation to at least one operator;
   a first input section that receives a first identification of the abbreviations understood by the at least one operator and if several abbreviations are understood by the at least one operator the abbreviation which the at least one operator understood quickest;
   a first selection section which is connected to said first input section and which selects, on the basis of said first identification, an abridged form for said term, wherein said selection section selects:
      if just one of said abbreviations is understood by the at least one operator, this abbreviation;
      if none of said abbreviations is understood by the at least one operator, said term in full; and
      if several of said abbreviations are understood by the at least one operator, that which the at least one operator understood quickest;
   a first complementary device comprising:
      at least one second database comprising, for a plurality of terms, preestablished abbreviations;
      a second presentation section for preparing a second presentation of the preestablished abbreviations to the operator;
      a second input section that receives second identification indicating which preestablished abbreviations are understood by the at least one operator; and
      a first indicating section connected to said second presentation section that indicates, based on the received second identification, whether said preestablished abbreviations are retained as abridged forms for the corresponding terms;
   a first link that transmits the preestablished abbreviations that are not understood by the at least one operator, according to said received second identification, from said first indicating section to said processor;
   a second complementary device comprising:
      at least one third database comprising initial words that are used for particular concepts relating to the aircraft;
      at least one fourth database comprising a first set of decisional criteria;
      a third presentation section for preparing a third presentation of said initial words to the operator, said third presentation having a characteristic that allows each of the initial words to be subjected to said first set of decisional criteria;
      a third input section that receives a third identification of the initial words, wherein the third identification indicates whether the initial words satisfy the first set of decisional criteria;
      a second indicating section, connected to said third presentation section, that indicates, based on said received third identification, whether said initial words are retained as appropriate terms for said concepts;
      at least one fifth database comprising a second set of decisional criteria;
      at least one sixth database comprising additional words for said concepts;
      a fourth presentation section for preparing a fourth presentation of said initial words not retained and the corresponding additional words for said concepts to the operator, said fourth presentation having a characteristic that allows each of said initial words not retained and the corresponding additional words to be subjected to said second set of decisional criteria;
      a fourth input section that receives a fourth identification of said initial words not retained and said corresponding additional words, wherein the fourth identification indicates the extent to which said initial words not retained and said corresponding additional words satisfy the second set of decisional criteria; and
      a third indicating section, connected to said second presentation section, that indicates, based on said received fourth identification related to the second set of decisional criteria, which analyzed words are retained as appropriate terms for the corresponding concepts;
   a second link that transmits the analyzed words not retained from said second indicating section to said processor; and
   a third link that transmits a term provided by an operator to said processor.

* * * * *

UNITED STATES PATENT AND TRADEMARK OFFICE
CERTIFICATE OF CORRECTION

PATENT NO. : 7,584,091 B2 Page 1 of 1
APPLICATION NO. : 10/465844
DATED : September 1, 2009
INVENTOR(S) : Gavieiro-Villatte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Fourteenth Day of September, 2010

David J. Kappos
*Director of the United States Patent and Trademark Office*